ём
2,714,590

ACID MONOAZO DYESTUFFS

Franz Frisch, Arlesheim, and Walter Wehrli, Riehen, Switzerland, assignors to Sandoz, A. G., Basel, Switzerland No Drawing. Application July 10, 1952,
Serial No. 298,184

Claims priority, application Switzerland July 18, 1951

6 Claims. (Cl. 260—199)

The present invention is concerned with acid monoazo dyestuffs.

A primary object of the invention is the embodiment of red dyestuffs of good fastness properties. This object is realized according to the invention by the acid monoazo dyestuffs which correspond to the formula

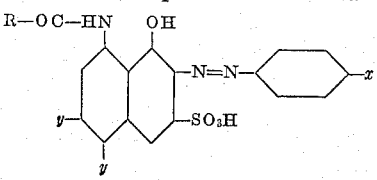

wherein $x$ stands for a radical selected from the group consisting of straight and branched chain alkyl radicals containing four and five carbon atoms, one $y$ stands for the sulfonic acid group, the other $y$ being hydrogen, and wherein R stands for a member selected from the group consisting of alkyl, chloroalkyl, alkyloxyalkyl, alkyloxy, cycloalkyloxy and mononuclear aralkyl, aryloxyalkyl, aryl, aryloxy and aralkyloxy.

The aforesaid dyestuffs can be prepared by coupling the diazo compound of an amine of the formula

wherein $x$ has the previously-recited significance, with a 1-hydroxy-8-acylaminonaphthalene-disulfonic acid of the formula

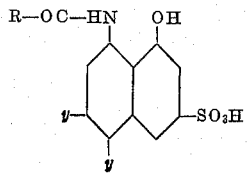

wherein R and $y$ have the previously-recited significances.

Illustrative of amines of Formula I, the diazo compounds which are suitable for building up the dyestuffs of the present invention, are 4-n-butyl-1-aminobenzene, 4-tertiary-butyl-1-aminobenzene, 4-n-amyl-1-aminobenzene, 4-tertiary-amyl-1-aminobenzene, etc.

Illustrative of suitable 1-hydroxy-8-acylaminonaphthalene-disulfonic acids of Formula II, are:

1-hydroxy-8-benzoylaminonaphthalene-3,5-disulfonic acid,
1-hydroxy-8-benzoylaminonaphthalene-3,6-disulfonic acid,
1-hydroxy - 8-(2' - monochlorobenzoyl) - aminonaphthalene-3,5-disulfonic acid,
1-hydroxy-8-(4'-monochlorobenzoyl)-aminonaphthalene-3,5-disulfonic acid,
1-hydroxy-8-(2',4'-dichlorobenzoyl) - aminonaphthalene-3,5-disulfonic acid,
1-hydroxy-8-(2',5'-dichlorobenzoyl) - aminonaphthalene-3,5-disulfonic acid,
1-hydroxy-8-(2'-monochlorobenzoyl - aminonaphthalene-3,6-disulfonic acid,
1-hydroxy-8-(4'-monochlorobenzoyl)-aminonaphthalene-3,6-disulfonic acid,
1-hydroxy-8-(2',4'-dichlorobenzoyl) - aminonaphthalene-3,6-disulfonic acid,
1-hydroxy-8-(2',5'-dichlorobenzoyl) - aminonaphthalene-3,6-disulfonic acid,
1-hydroxy-8-(4'-methylbenzoyl) - aminonaphthalene-3,5-disulfonic acid,
1-hydroxy-8-(4'-methylbenzoyl) - aminonaphthalene-3,6-disulfonic acid,
1-hydroxy -8-(3'- nitrobenzoyl) - aminonaphthalene-3,5-disulfonic acid,
1-hydroxy -8-(4'- nitrobenzoyl) - aminonaphthalene-3,5-disulfonic acid,
1-hydroxy-8-(3'-nitrobenzoyl) - aminonaphthalene-3,6-disulfonic acid,
1-hydroxy-8-(4'-nitrobenzoyl) - aminonaphthalene-3,6-disulfonic acid,
1-hydroxy-8-(4'-methoxybenzoyl)-aminonaphthalene-3,5-disulfonic acid,
1-hydroxy-8-(4'-methoxybenzoyl)-aminonaphthalene-3,6-disulfonic acid,
1-hydroxy-8-acetylamino-naphthalene-3,5-disulfonic acid,
1-hydroxy-8-acetylaminonaphthalene-3,6-disulfonic acid,
1-hydroxy-8-propionylaminonaphthalene - 3,5 - disulfonic acid,
1-hydroxy-8-propionylaminonaphthalene - 3,6 - disulfonic acid,
1-hydroxy-8-butyrylaminonaphthalene-3,5-disulfonic acid,
1-hydroxy-8-butyrylaminonaphthalene-3,6-disulfonic acid,
1-hydroxy-8-chloroacetylaminonaphthalene-3,5-disulfonic acid,
1-hydroxy-8-chloroacetylaminonaphthalene-3,6-disulfonic acid,
1-hydroxy-8-chloropropionylaminonaphthalene-3,5-disulfonic acid,
1-hydroxy-8-chloropropionylaminonaphthalene-3,6-disulfonic acid,
1-hydroxy-8-chlorobutyrylaminonaphthalene - 3,5 - disulfonic acid,
1-hydroxy - 8 - chlorobutyrylaminonaphthalene - 3,6 - disulfonic acid,
1-hydroxy-8 - methoxyacetylaminonaphthalene - 3,5 - disulfonic acid,
1-hydroxy-8 - methoxyacetylaminonaphthalene - 3,6 - disulfonic acid,
1-hydroxy - 8 - ethoxypropionylaminonaphthalene - 3,5-disulfonic acid,
1 - hydroxy-8 - ethoxypropionylaminonaphthalene - 3,6-disulfonic acid.
1-hydroxy-8-butoxy-ethoxy-acetylaminonaphthalene - 3,5-disulfonic acid,
1-hydroxy-8 - butoxy - ethoxy - acetylaminonaphthalene-3,6-disulfonic acid,
1-hydroxy-8-phenylacetylaminonaphthalene - 3,5 - disulfonic acid,
1-hydroxy-8 - phenylacetylaminonaphthalene - 3,6 - disulfonic acid,
1-hydroxy-8 - (4' - methylphenylacetyl) - aminonaphthalene-3,5-disulfonic acid,
1-hydroxy-8 - (4' - methylphenylacetyl) - aminonaphthalene-3,6-disulfonic acid,
1-hydroxy-8-(4' - methoxyphenylacetyl) - aminonaphthalene-3,5-disulfonic acid,
1-hydroxy-8-(4' - methoxyphenylacetyl) - aminonaphthalene-3,6-disulfonic acid,
1-hydroxy-8 - phenoxyacetylaminonaphthalene - 3,5 - disulfonic acid,
1-hydroxy-8 - phenoxyacetylaminonaphthalene - 3,6 - disulfonic acid,
1-hydroxy-8 - (2' - nitrophenoxy-acetyl) - aminonaphthalene-3,5-disulfonic acid, 1-hydroxy-8-(2' - nitrophenoxy - acetyl) - aminonaphthalene-3,6-disulfonic acid,
1-hydroxy-8-(4' - nitrophenoxy - acetyl) - aminonaphthalene-3,5-disulfonic acid,
1-hydroxy-8-(4' - nitrophenoxy - acetyl) - aminonaphthalene-3,6-disulfonic acid,
1-hydroxy-8-(2'-chlorophenoxy - acetyl) - aminonaphthalene-3,5-disulfonic acid,
1-hydroxy-8-(2'-chlorophenoxy - acetyl) - aminonaphthalene-3,6-disulfonic acid,
1-hydroxy-8-(4'-chlorophenoxy - acetyl) - aminonaphthalene-3,5-disulfonic acid,
1-hydroxy-8-(4'-chlorophenoxy - acetyl) - aminonaphthalene-3,6-disulfonic acid,
1-hydroxy-8-(4'-methylphenoxy-acetyl) - aminonaphthalene-3,5-disulfonic acid,
1-hydroxy-8-(4'-methylphenoxy-acetyl) - aminonaphthalene-3,6-disulfonic acid,
1-hydroxy-8-(4'-tert.-amylphenoxy - acetyl) - aminonaphthalene-3,5-disulfonic acid,
1-hydroxy-8-(4'-tert.-amylphenoxy - acetyl) - aminonaphthalene-3,6-disulfonic acid,
1-hydroxy-8-carbomethoxy - aminonaphthalene - 3,5 - disulfonic acid,
1-hydroxy-8-carbomethoxy - aminonaphthalene - 3,6 - disulfonic acid,
1-hydroxy-8-carbethoxy - aminonaphthalene - 3,5 - disulfonic acid,
1-hydroxy-8-carbethoxy - aminonaphthalene - 3,6 - disulfonic acid,
1-hydroxy-8-carbopropoxy - aminonaphthalene - 3,5 - disulfonic acid,
1-hydroxy-8-carbopropoxy - aminonaphthalene - 3,6 - disulfonic acid,
1-hydroxy-8 - methoxy - carbethoxy - aminonaphthalene-3,5-disulfonic acid,
1-hydroxy-8 - methoxy - carbethoxy - aminonaphthalene-3,6-disulfonic acid,
1-hydroxy-8-ethoxy-carbethoxy - aminonaphthalene - 3,5-disulfonic acid,
1-hydroxy-8-ethoxy-carbethoxy - aminonaphthalene - 3,6-disulfonic acid,
1-hydroxy-8-ethoxy-ethoxy - carbethoxy - aminonaphthalene-3,5-disulfonic acid,
1-hydroxy-8-ethoxy-ethoxy - carbethoxy - aminonaphthalene-3,6-disulfonic acid,
1-hydroxy-8-ethoxy-carbobutoxy-aminonaphthalene - 3,5-disulfonic acid,
1-hydroxy - 8 - ethoxy - carbobutoxy - aminonaphthalene-3,6-disulfonic acid,
1-hydroxy-8-ethoxy-ethoxy-carbobutoxy - aminonaphthalene-3,5-disulfonic acid,
1-hydroxy-8-ethoxy-ethoxy-carbobutoxy - aminonaphthalene-3,6-disulfonic acid,
1-hydroxy-8-carbophenoxy-aminonaphthalene-3,5 - disulfonic acid,
1-hydroxy-8-carbophenoxy-aminonaphthalene-3,6 - disulfonic acid,
1-hydroxy-8-carbobenzyloxy-aminonaphthalene - 3,5 - disulfonic acid,
1-hydroxy-8-carbobenzyloxy-aminonaphthalene - 3,6 - disulfonic acid,
1-hydroxy-8-carbocyclohexoxy - aminonaphthalene - 3,5-disulfonic acid,
1-hydroxy-8-carbocyclohexoxy - aminonaphthalene - 3,6-disulfonic acid,
1-hydroxy-8-carbo-(2'-chloro)-phenoxy - aminonaphthalene-3,5-disulfonic acid,
1-hydroxy-8-carbo-(2'-chloro)-phenoxy - aminonaphthalene-3,6-disulfonic acid,
1-hydroxy-8-carbo-(4'-methyl)-phenoxy - aminonaphthalene-3,5-disulfonic acid,
1-hydroxy-8-carbo-(4'-methyl)-phenoxy - aminonaphthalene-3,6-disulfonic acid, etc.

The coupling of the diazo compound of amine I with the 1-hydroxy-8-acylaminonaphthalene-disulfonic acid II is preferably carried out in an aqueous solution rendered alkaline with sodium bicarbonate. The resultant coupling product is isolated in per se conventional manner, for example by salting out of the aqueous solution.

The acid monoazo dyestuffs of the invention dissolve in water with red coloration and dye wool, silk and other animal fibers, as well as nylon, from a neutral or weakly acid bath in bright red shades of good fastness to light and of good to excellent wet-fastness properties.

The following examples illustrate the invention, without however being limitative thereof. The recited parts are by weight, and the temperatures are in degrees centigrade.

Example 1

14.9 parts of 4-n-butyl-1-aminobenzene are diazotized, and the clear diazo solution is coupled with 50 parts of 1-hydroxy - 8 - (2',4' - dichlorobenzoyl) - aminonaphthalene-3,5-disulfonic acid in aqueous solution containing an excess of sodium bicarbonate at 0–5°. Upon completion of the coupling, the dyestuffs, which correspond to the formula

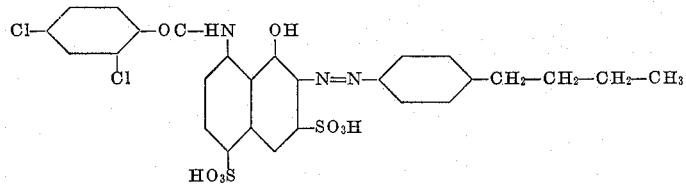

is salted out, filtered off, and dried. It is a red powder which dissolves with bluish-red coloration in hot water, and dyes wool, silk and nylon from a neutral or weakly acid bath in fast bright red shades.

Dyestuffs with similar properties are obtained when, while otherwise proceeding as described in the preceding paragraph, the 50 parts of 1-hydroxy-8-(2',4'-dichlorobenzoyl)-aminonaphthalene-3,5-disulfonic acid are replaced by 44 parts of 1-hydroxy-8-(4'-methylbenzoyl)-aminonaphthalene-3,5- or 3,6-disulfonic acid or by 48 parts of 1 - hydroxy - 8 - (3' - or 4'-nitrobenzoyl)-aminonaphthalene-3,5- or 3,6-disulfonic acid or by 46 parts of 1 - hydroxy - 8 - (4' - methoxybenzoyl) - aminonaphthalene-3,5- or 3,6-disulfonic acid or by 46 parts of 1-hydroxy-8-(2' - chlorobenzoyl) - aminonaphthalene - 3,5- or 3,6-disulfonic acid or by 50 parts of 1-hydroxy-8-(2',5'-dichlorobenzoyl)-aminonaphthalene-3,5- or 3,6-disulfonic acid, and/or the 14.9 parts of 4-n-butyl-1-aminobenzene are replaced by 14.9 parts of 4-tertiary-butyl-1-aminobenzene.

Example 2

16.3 parts of 4-tertiary-amyl-1-aminobenzene are diazotized and the clear diazo solution is coupled at 0–5° with 43 parts of 1-hydroxy-8-benzoylaminonaphthalene-3,5-disulfonic acid in aqueous solution containing an excess of sodium bicarbonate. Upon completion of the coupling, the formed dyestuff:

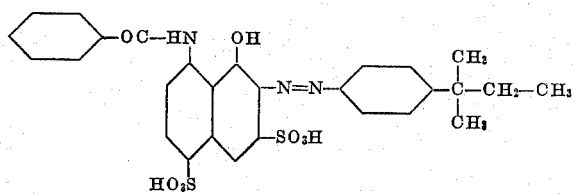

is salted out, filtered off and dried. It is a red powder which dissolves in hot water with red coloration and dyes wool, silk and nylon from a neutral or weakly acid both in fast bright red shades.

Dyestuffs with similar properties are obtained when, while otherwise proceeding according to the foregoing paragraph, the 43 parts of 1-hydroxy-8-benzoylaminonaphthalene-3,5-disulfonic acid are replaced by (a) 43 parts of 1-hydroxy-8-benzoylaminonaphthalene-3,6-disulfonic acid, or by (b) 46 parts of 1-hydroxy-8-(4'-chlorobenzoyl)-aminonaphthalene-3,5-disulfonic acid, or by (c) 46 parts of 1-hydroxy-8-(4'-chlorobenzoyl)-aminonaphthalene-3,6-disulfonic acid.

The resultant dyestuffs correspond to the following formulae:

(a)

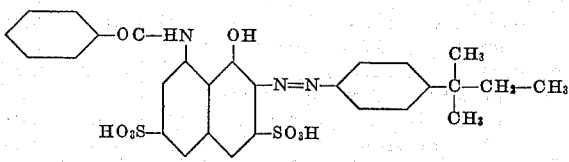

(b)

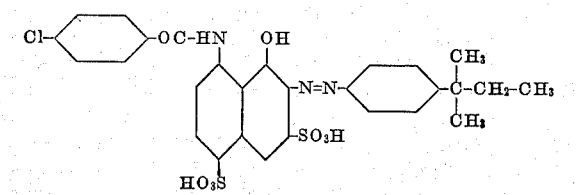

(c)

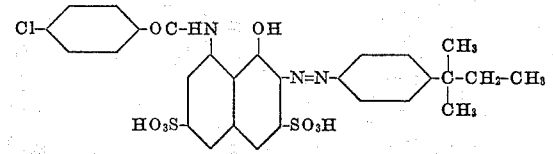

Likewise, dyestuffs with similar properties are obtained when, under the indicated conditions, the 43 parts of 1-hydroxy-8-benzoylaminonaphthalene-3,5-disulfonic acid of the present example are replaced by 50 parts of 1-hydroxy-8-(2',4'- or -2',5'-dichlorobenzoyl)-aminonaphthalene-3,5- or -3,6-disulfonic acid, or by 46 parts of 1-hydroxy-8-(2'-chlorobenzoyl)-aminophthalene-3,5- or -3,6-disulfonic acid or by 44 parts of 1-hydroxy-8-(4'-methylbenzoyl)-aminonaphthalene-3,5- or -3,6-disulfonic acid or by 48 parts of 1-hydroxy-8-(3' or -4'-nitrobenzoyl)-aminonaphthalene-3,5- or -3,6-disulfonic acid or by 46 parts of 1-hydroxy-8-(4'-methoxybenzoyl)-aminonaphthalene-3,5- or -3,6-disulfonic acid and/or the 16.3 parts of 4-tertiary-amyl-1-aminobenzene are replaced by 4-n-amyl-1-aminobenzene.

*Example 3*

16.3 parts of 4-tertiary-amyl-1-aminobenzene are diazotized and the clear diazo solution is coupled at 0–5° with 44 parts of 1-hydroxy-8-phenylacetylaminonaphthalene-3,6-disulfonic acid in aqueous solution containing an excess of sodium bicarbonate. Upon completion of the coupling, the formed dyestuff:

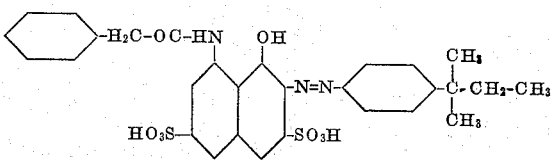

is salted out, filtered off and dried. It is a red powder which dissolves in hot water with red coloration and dyes wool, silk and nylon from a neutral or weakly acid bath in fast bright red shades.

Dyestuffs with similar properties are obtained when, while otherwise proceeding as described in the foregoing paragraph, the 44 parts of 1-hydroxy-8-phenylacetylaminonaphthalene-3,6-disulfonic acid are replaced by 44 parts of 1-hydroxy-8-phenylacetylaminonaphthalene-3,5-disulfonic acid or by 46 parts of 1-hydroxy-8-(4'-methylphenyl)-acetylaminonaphthalene-3,5- or -3,6-disulfonic acid or by 47parts of 1-hydroxy-8-(4'-methoxyphenyl)-acetylaminonaphthalene-3,5- or -3,6-disulfonic acid and/or the 16.3 parts of 4-tertiary-amyl-1-aminobenzene are replaced by 14.9 parts of a 4-butyl-1-aminobenzene.

*Example 4*

16.3 parts of 4-tertiary-amyl-1-aminobenzene are diazotized and the clear diazo solution is coupled at 0–5° with 48 parts of 1-hydroxy-8-(4'-methylphenoxy)-acetylaminonaphthalene-3,5-disulfonic acid in an aqueous solution containing an excess of sodium bicarbonate. Upon completion of the coupling, the resultant dyestuff of the formula:

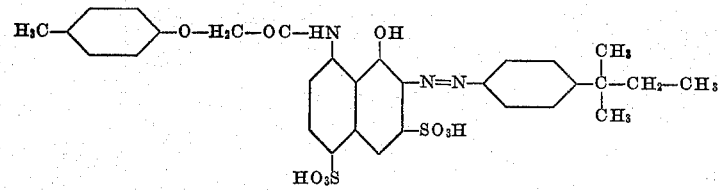

is salted out, filtered off and dried. It is a red powder which dissolves in hot water with red coloration and dyes wool, silk and nylon from a neutral or weakly acid bath in fast bright red shades.

Dyestuffs with similar properties are obtained when, while otherwise proceeding as described in the preceding paragraph, the 48 parts of 1-hydroxy-8-(4'-methylphenoxy)-acetylaminonaphthalene-3,5-disulfonic acid are replaced by (a) 46 parts of 1-hydroxy-8-phenoxyacetylaminonaphthalene-3,5-disulfonic acid, or by (b) 48 parts of 1-hydroxy-8-(4'-methylphenoxy)-acetylaminonaphthalene-3,6-disulfonic acid.

These correspond respectively to the following formulae:

(a)
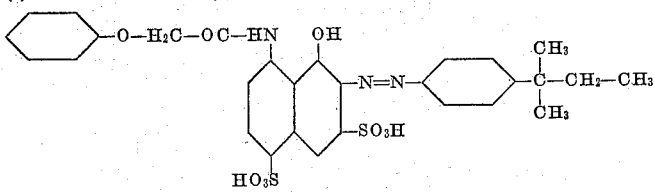

(b)
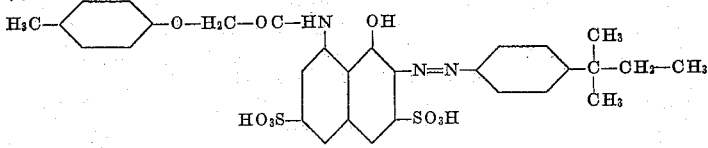

Likewise, similar dyestuffs are obtained when, under the indicated conditions, the 48 parts of 1-hydroxy-8-(4'-methylphenoxy) - acetylaminopnaphthalene-3,5-disulfonic acid are replaced by 46 parts of 1-hydroxy-8-phenoxy-acetylaminonaphthalene-3,6-disulfonic acid or by 50 parts of 1-hydroxy-8-(2'- or -4'-chlorophenoxy)-acetylaminonaphthalene-3,5- or -3,6-disulfonic acid or by 51 parts of 1-hydroxy-8-(2'- or -4'-nitrophenoxy)-acetylaminonaphthalene-3,5- or -3,6-disulfonic acid or by 54 parts of 1-hydroxy-8-(4'-tertiary-amyl-phenoxy)-acetylaminonaphthalene-3,5- or -3,6-disulfonic acid or by 1-hydroxy-8-(methoxy-acetyl)- or -(ethoxy-propionyl)- or -(butoxy - ethoxy-acetyl)-aminonaphthalene-3,5- or 3,6-disulfonic acid and/or the 16.3 parts of 4-tertiary-amyl-1-aminobenzene are replaced by 16.3 parts of 4-n-amyl-1-aminobenzene or by 14.9 parts of a 4-butyl-1-aminobenzene.

Example 5

16.3 parts of 4-tertiary-amyl-1-aminobenzene are diazotized and the clear diazo solution coupled at 0–5° with 38 parts of 1-hydroxy-8-carbethoxy-aminonaphthalene-3,6-disulfonic acid in an aqueous solution containing an excess of sodium bicarbonate. Upon completion of the coupling, the resultant dyestuff, which corresponds to the formula

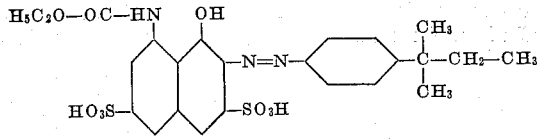

is salted out, filtered off and dried. It is a red powder which dissolves in water with bluish-red coloration and dyes wool, silk and nylon from a neutral or weakly acid bath in fast bright bluish-red shades.

Dyestuffs with similar properties are obtained when, while otherwise proceeding according to the foregoing paragraph, the 1-hydroxy-8-carbethoxy-aminonaphthalene-3,6-disulfonic acid is replaced by an equivalent quantity of 1-hydroxy-8-carbomethoxy- or -carbopropoxy- or -carboisopropoxy- or -carbophenoxy- or -carbobenzyloxy- or -carbocyclohexoxy-aminonaphthalene-3,5- or -3,6-disulfonic acid or of 1-hydroxy-8-ethoxy-carbomethoxy- or -ethoxy-carbomethoxy- or -ethoxy-ethoxy-carbethoxy- or -ethoxy-carbobutoxy- or -ethoxy-ethoxy-carbobutoxy-aminonaphthalene-3,5- or -3,6-disulfonic acid or of 1-hydroxy-8-carbo-(2'-chloro- or -4'-methyl)-phenoxy-aminonaphthalene-3,5- or -3,6-disulfonic acid and/or the 16.3 parts of 4-tertiary-amyl-1-aminobenzene are replaced by 16.3 parts of 4-n-amyl-1-aminobenzene or by 14.9 parts of a 4-butyl-1-aminobenzene.

Example 6

16.3 parts of 4-tertiary-amyl-1-aminobenzene are diazotised and the clear diazo solution is coupled at 0–5° with 37 parts of 1-hydroxy-8-acetylaminonaphthalene-3,6-disulfonic acid in an aqueous solution containing an excess of sodium bicarbonate. Upon completion of the coupling, the formed dyestuff, which corresponds to the formula

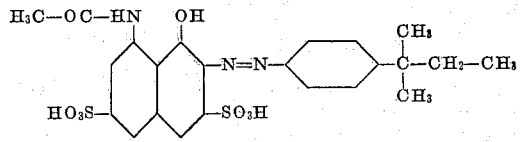

is salted out, filtered off and dried. It is a red powder which dissolved in water and dyes wool, silk and nylon from a neutral or weakly acid bath in fast bright red shades.

Dyestuffs with similar properties are obtained when, while otherwise proceeding as set forth in the foregoing paragraph, 37 parts of 1-hydroxy-8-acetylaminonaphthalene-3,6-disulfonic acid are replaced by 40 parts of 1-hydroxy-8-chloracetylaminonaphthalene-3,5- or -3,6-disulfonic acid or by 42 parts of 1-hydroxy-8-chloropropionyl-aminonaphthalene-3,5- or -3,6-disulfonic acid.

Likewise, dyestuffs with similar properties are obtained when, under the indicated conditions, the 1-hydroxy-8-acetylaminonaphthalene-3,6-disulfonic acid is replaced by an equivalent quantity of 1-hydroxy-8-propionyl- or -butyrylaminonaphthalene-3,5- or -3,6-disulfonic acid.

Example 7

100 parts of wool are introduced at 40–50° into a dyebath containing 1 part of any one of the dyestuffs prepared according to Examples 1 to 6, 10 parts of sodium sulfate, 2 parts of acetic acid and 8000 parts of water. The bath is then heated to boiling, maintained at boiling for 30 minutes, and then cooled to about 70°, whereupon 2 parts of acetic acid are added and the bath then again heated to boiling for 30 minutes. The wool is then rinsed and dried; it is dyed in a fast bright red shade.

The dyeing of nylon and of silk is carried out in essentially similar manner, although in the case of silk the heating is to a temperature of 90–95° instead of to the boil.

Having thus disclosed the invention what is claimed is:

1. The acid monoazo dyestuffs corresponding to the general formula

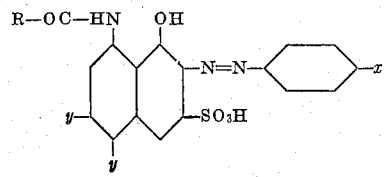

wherein $x$ stands for a radical selected from the group consisting of straight and branched chain alkyl radicals containing four and five carbon atoms, one $y$ stands for the sulfonic acid group, the other $y$ being hydrogen, and wherein R stands for a member selected from the class consisting of alkyl, chloroalkyl, alkyloxyalkyl, alkyloxy, cycloalkyloxy and mononuclear aralkyl, aryloxyalkyl, aryl, aryloxy and aralkyloxy, the alkyl in the last-mentioned class being lower alkyl throughout.

2. The monoazo dyestuff which corresponds to the formula

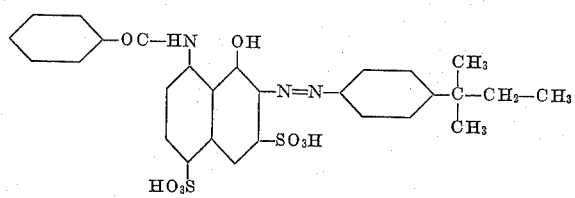

3. The monoazo dyestuff which corresponds to the formula

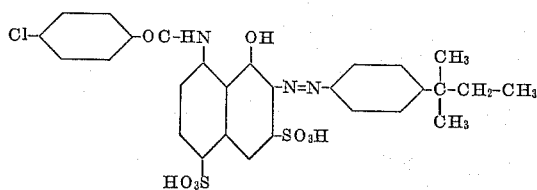

4. The monoazo dyestuff which corresponds to the formula

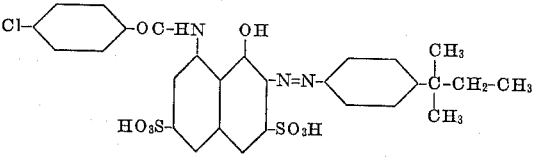

5. The monoazo dyestuff which corresponds to the formula

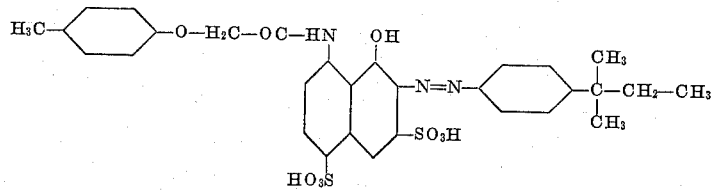

6. The monoazo dyestuff which corresponds to the formula

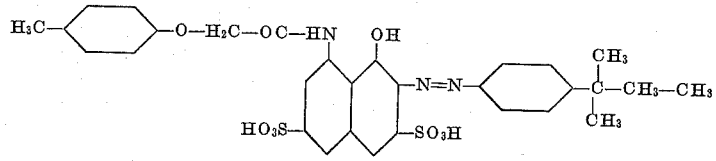

References Cited in the file of this patent

UNITED STATES PATENTS

| | | |
|---|---|---|
| 1,073,902 | Julius et al. | Sept. 23, 1913 |
| 1,073,951 | Blangey et al. | Sept. 23, 1913 |
| 2,059,512 | Fleischhauer | Nov. 3, 1936 |
| 2,095,468 | Fleischhauer | Oct. 12, 1937 |